(12) United States Patent
Brown et al.

(10) Patent No.: US 7,539,933 B2
(45) Date of Patent: May 26, 2009

(54) APPARATUS AND METHOD OF HIGHLIGHTING LINKS IN A WEB PAGE

(75) Inventors: Joe Nathan Brown, Austin, TX (US); Philip Bernard Burkes, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1427 days.

(21) Appl. No.: 09/998,386

(22) Filed: Nov. 15, 2001

(65) Prior Publication Data
US 2004/0205500 A1  Oct. 14, 2004

(51) Int. Cl.
*G06F 17/00*  (2006.01)
*G06F 3/048*  (2006.01)

(52) U.S. Cl. .................. 715/207; 715/205; 715/234; 715/856

(58) Field of Classification Search ................. 715/513, 715/501.1, 526, 804, 845, 760, 783–786, 715/810, 200, 207, 234, 273, 859, 860, 205, 715/206, 252, 255, 275, 763, 772, 856, 857, 715/858
See application file for complete search history.

(56) References Cited

U.S. PATENT DOCUMENTS

| | | | | |
|---|---|---|---|---|
| 5,878,223 A | * | 3/1999 | Becker et al. | 709/223 |
| 5,963,950 A | * | 10/1999 | Nielsen et al. | 707/102 |
| 5,982,370 A | * | 11/1999 | Kamper | 715/760 |
| 5,987,482 A | * | 11/1999 | Bates et al. | 715/513 |
| 6,021,435 A | * | 2/2000 | Nielsen | 709/224 |
| 6,034,689 A | * | 3/2000 | White et al. | 715/854 |
| 6,182,133 B1 | * | 1/2001 | Horvitz | 709/223 |
| 6,184,885 B1 | * | 2/2001 | DeStefano | 345/804 |
| 6,211,874 B1 | * | 4/2001 | Himmel et al. | 715/781 |
| 6,222,541 B1 | * | 4/2001 | Bates et al. | 345/786 |
| 6,237,030 B1 | * | 5/2001 | Adams et al. | 709/218 |
| 6,323,884 B1 | * | 11/2001 | Bird et al. | 715/810 |
| 6,456,307 B1 | * | 9/2002 | Bates et al. | 715/838 |
| 6,493,000 B1 | * | 12/2002 | Wynn et al. | 715/733 |

(Continued)

FOREIGN PATENT DOCUMENTS

GB  23362226  * 10/1999

(Continued)

OTHER PUBLICATIONS

"Next Button for Jumping/Tabbing between Internet Hypertext Transfer Protocol Hyperlinks", IBM Technical Disclosure Bulletin, Jan. 1998, 435-436.*

(Continued)

*Primary Examiner*—Doug Hutton
*Assistant Examiner*—Maikhanh Nguyen
(74) *Attorney, Agent, or Firm*—Volel Emile; Diana L. Gerhardt; Mark E. McBurney (57) ABSTRACT

An apparatus and method of highlighting links that are not clearly identifiable in a Web document are provided. When the document is displayed, if the links are not clearly recognizable as such, the user may depress a button. Upon depressing the button, all the links embedded in the document will be highlighted. Here, highlighted is used to mean any manner that may be used to make the links clearly recognizable as such.

28 Claims, 7 Drawing Sheets

U.S. PATENT DOCUMENTS

| | | | |
|---|---|---|---|
| 6,598,072 B1 * | 7/2003 | McBrearty et al. | 709/203 |
| 6,601,066 B1 * | 7/2003 | Davis-Hall | 707/5 |
| 6,745,227 B1 * | 6/2004 | Bates et al. | 709/203 |
| 6,751,777 B2 * | 6/2004 | Bates et al. | 715/501.1 |
| 6,788,316 B1 * | 9/2004 | Ma et al. | 715/760 |
| 6,952,799 B2 * | 10/2005 | Edwards et al. | 715/207 |
| 2001/0047375 A1 * | 11/2001 | Fest | 707/526 |
| 2001/0048677 A1 * | 12/2001 | Boys | 370/352 |
| 2002/0129114 A1 * | 9/2002 | Sundaresan et al. | 709/213 |
| 2002/0178007 A1 * | 11/2002 | Slotznick et al. | 704/270.1 |
| 2003/0196172 A1 * | 10/2003 | Bates et al. | 715/513 |

FOREIGN PATENT DOCUMENTS

| | | |
|---|---|---|
| GB | 2350213 A * | 11/2000 |
| WO | WO 97/49044 * | 12/1997 |

OTHER PUBLICATIONS

Warren Ernst "Using Netscape" from QUE, Mar. 1995, pp. 322-324.*

R. Glushko, "Design Issues for Multi-Document Hypertexts", ACM, Nov. 1989, pp. 51-60.*

J. Allan, "Automatic Hypertext Link Typing", ACM, 1996, pp. 42-52.*

M. Noirhomme-Fraiture et al., "Visual Representation of Hypermedia Links According to Their Types", Proc. Working Conf. on Advanced Visual Interface, Italy, May 1998, pp. 146-155.*

* cited by examiner

FIG. 7

APPARATUS AND METHOD OF HIGHLIGHTING LINKS IN A WEB PAGE

BACKGROUND OF THE INVENTION

1. Technical Field

The present invention is directed to an apparatus and method of managing HTML documents. More specifically, the present invention is directed to an apparatus and method of highlighting links in a Web page when the links are not easily recognizable as such.

2. Description of Related Art

The Internet or the World Wide Web (WWW) has become a very convenient and inexpensive resource for finding information about nearly every subject imaginable. Users can shop for merchandise, get stock quotes, tune into radio programs, chat with other users and engage in a host of other activities. The ever-increasing use of the Internet has been facilitated by the widespread availability of computer programs called Web browsers. A Web browser is a program that is used for establishing communication between two computers on a network using the hypertext transfer protocol (HTTP).

In a typical transaction, a Web browser transmits a request to download a document indicated by an address called a uniform resource locator (URL). The download request is routed through the Web until it reaches a Web server indicated by the URL. The Web server responds to the request by transmitting the indicated document, commonly called a "Web page," back to the requesting computer.

Web pages are usually written using the hypertext mark up language (HTML) and often include links to other objects such as documents, images etc. Links are references to documents from within other documents. Links allow a user to easily jump from one document or Web page to another with just a click of a mouse. Thus, a link is a very useful Internet navigational tool.

Generally, links are displayed in a fashion that allows users to identify them as such. For example, a link may be underlined or may be in a different color than the rest of the text within which it is embedded or both. Although links are ordinarily presented in an identifiable fashion, sometimes it may not be very easy for a user to so identify the links. For instance, when the color used to display a link is the same or very close to the background color of a screen on which the Web page is displayed, a user may not be able to identify the link as such. Furthermore, users have often times mistaken an underlined phrase as a link.

Thus, what is needed is an apparatus and method of identifying a link as such when needed.

SUMMARY OF THE INVENTION

The present invention provides an apparatus and method of highlighting links that are not clearly identifiable in a Web document. When the document is displayed, if the links are not clearly recognizable as such, the user may depress a button. Upon depressing the button, all the links embedded in the document will be highlighted. Here, highlighted is used to mean any manner that may be used to make the links clearly recognizable as such.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
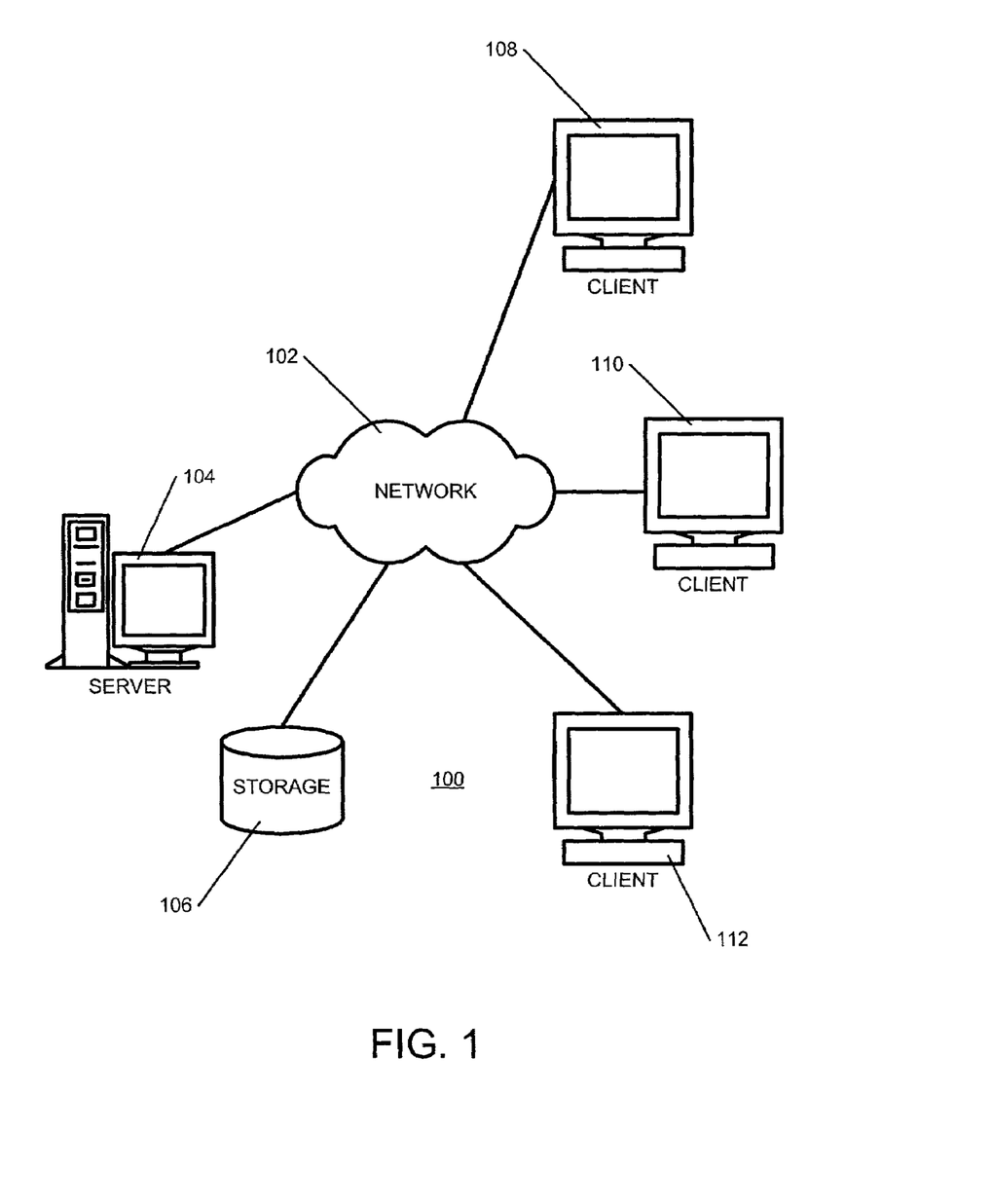
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
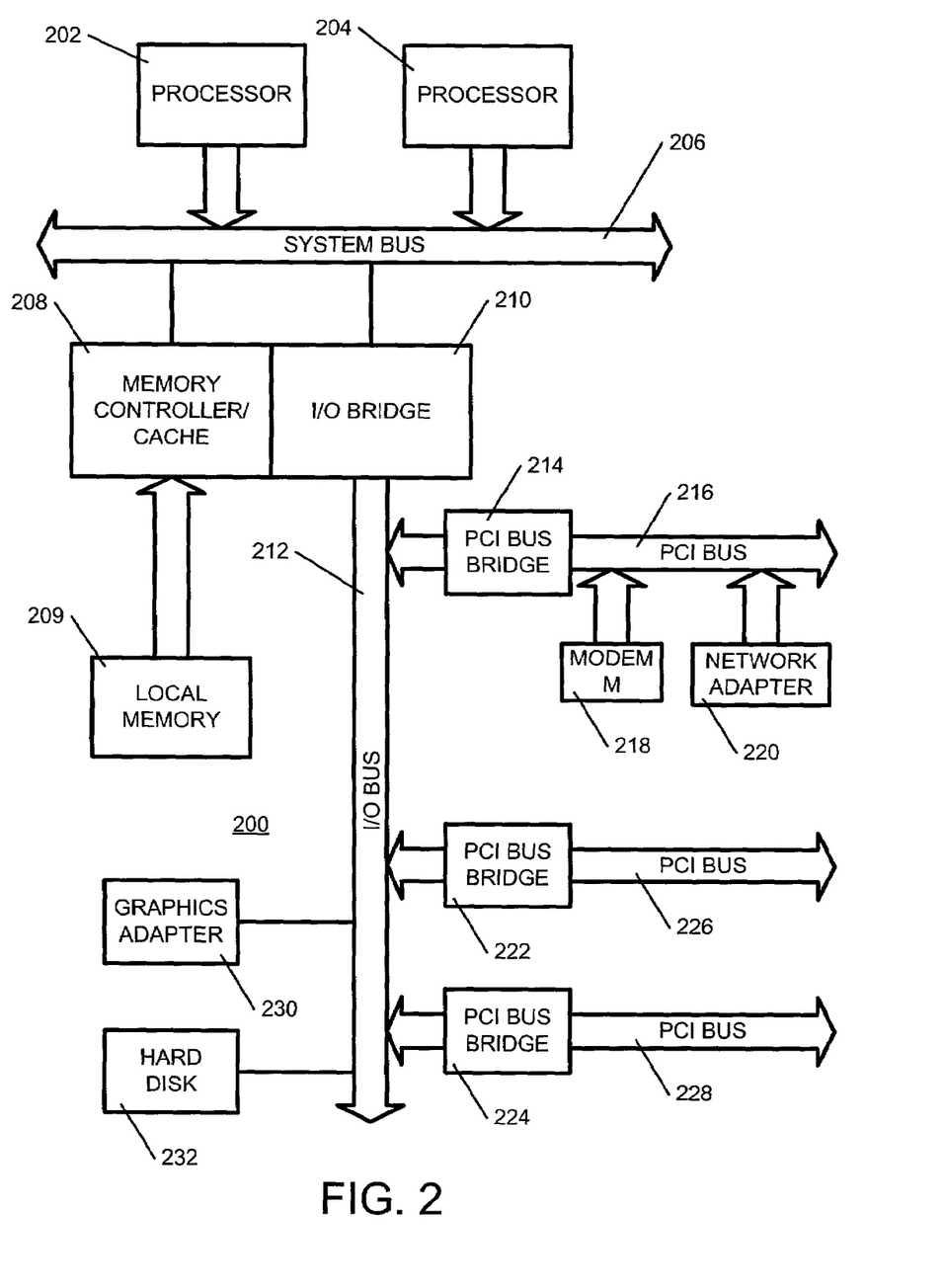
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
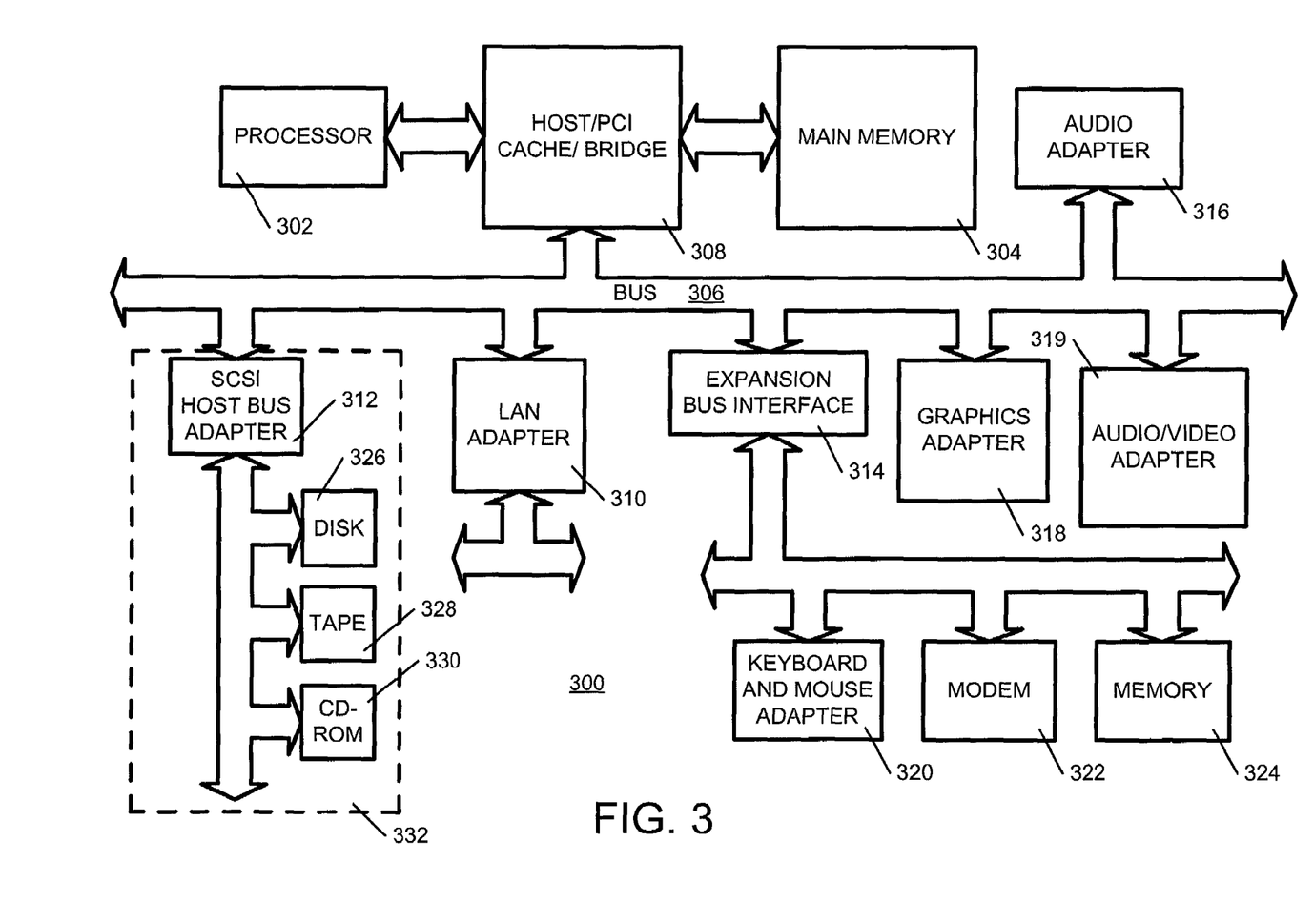
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention provides an apparatus and method of highlighting links in a Web document when the links are not easily identifiable as such. Note that here highlighting is used to mean any manner of making the links recognizable to a user. In any case, the invention may be local to client systems 108, 110 and 112 of FIG. 1 or to the server 104 or to both the server 104 and clients 108, 110 and 112. Consequently, the present invention may reside on any data storage medium (i.e., floppy disk, compact disk, hard disk, ROM, RAM, etc.) used by a computer system.

Figure 4:
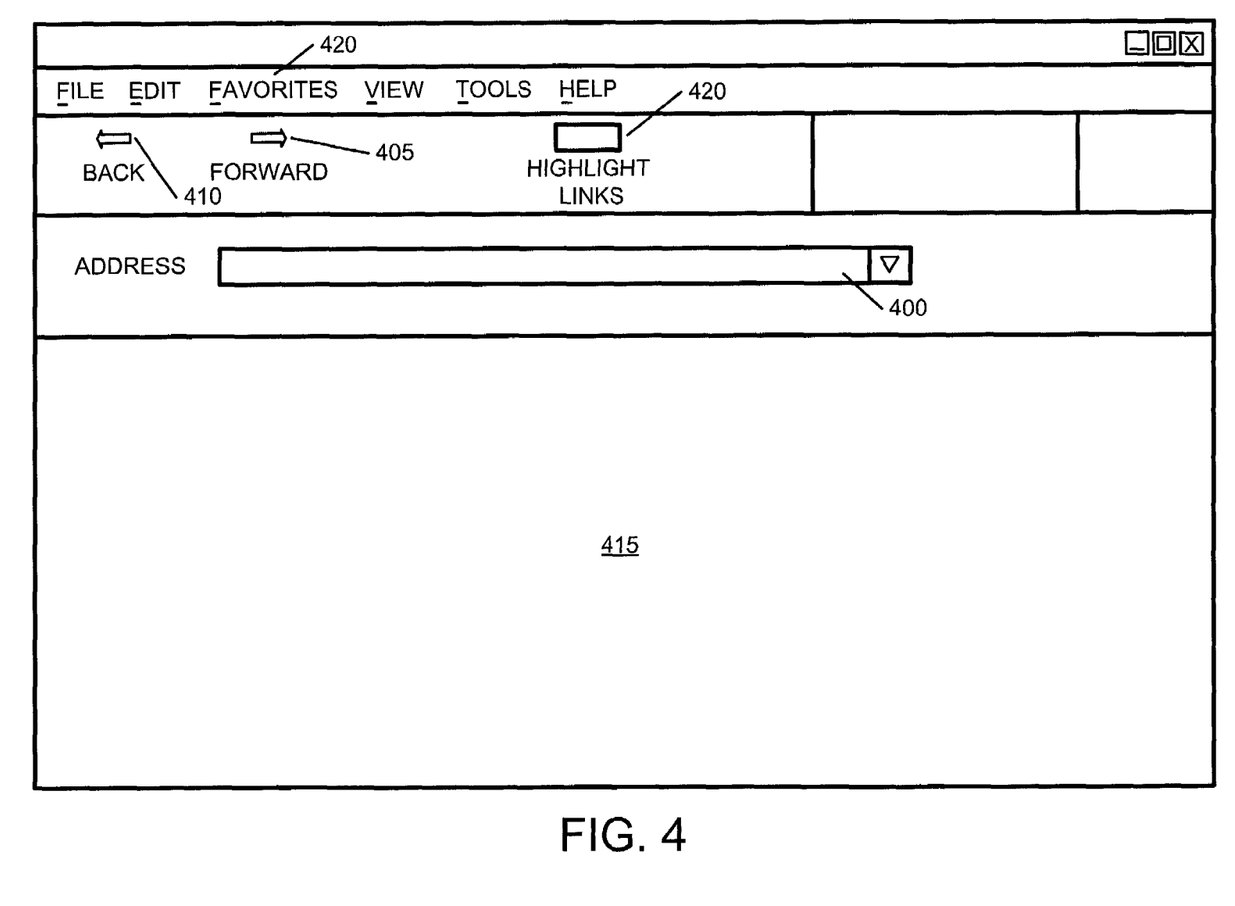
FIG. 4 is a representative graphical user interface (GUI) of a Web browser used by the present invention.

FIG. 4 is a representative graphical user interface (GUI) of a Web browser used by the invention. Not all items in the GUI are shown and only the items of importance are given a reference numeral. When a Web browser is activated and a Web page is accessed, the content of the page is displayed in area 415, the address or URL of the page is displayed in address box 400. Back arrow 410 and forward arrow 405 are not live (i.e., a user cannot assert them to get to a Web page). If another Web page is accessed, the URL of the displayed page will be displayed in address box 400 and the content in area 415. The back arrow 410 will become live. If the user asserts back arrow 410, the previous page will be re-displayed along will its pertinent information (i.e., URL, content etc.). At that time, forward arrow 405 will become live, back arrow 410 will not be live. If a user accesses three different Web pages successively, and while the third page is displayed returns to the second page using the back arrow 410, both back arrow 410 and forward arrow 405 will be live. The user may assert back arrow 410 to re-display the first Web page or forward arrow 405 to re-display the third Web page. This is made possible by caching or storing the URLs in a memory device (not shown) in the order the Web pages were accessed. Note that, if a new Web page is accessed while the second Web page is displayed, the URL of the new page will be cached replacing the URL of the third page. Caching URLs of Web pages is a well-known art and is thus not explained.

FIG. 4 also contains a highlight links button 420. This button may be used when a user, for any reason, is having difficulty identifying links embedded in the displayed Web page in area 415. Depending on the implementation, when the user asserts highlight links button 420, all the links in the document may be emboldened or may flash or may be displayed in a different color or using a larger font or a totally different font than the rest of the text in the document.

In addition, when the invention is used, the links as well as their target area may be enlarged. This is particularly useful to users with moderate visual impairments as it enables them to access Web pages through embedded links without any other special devices. The invention may also be beneficial to users who have difficulty pointing a mouse to regular embedded links.

Figure 5:
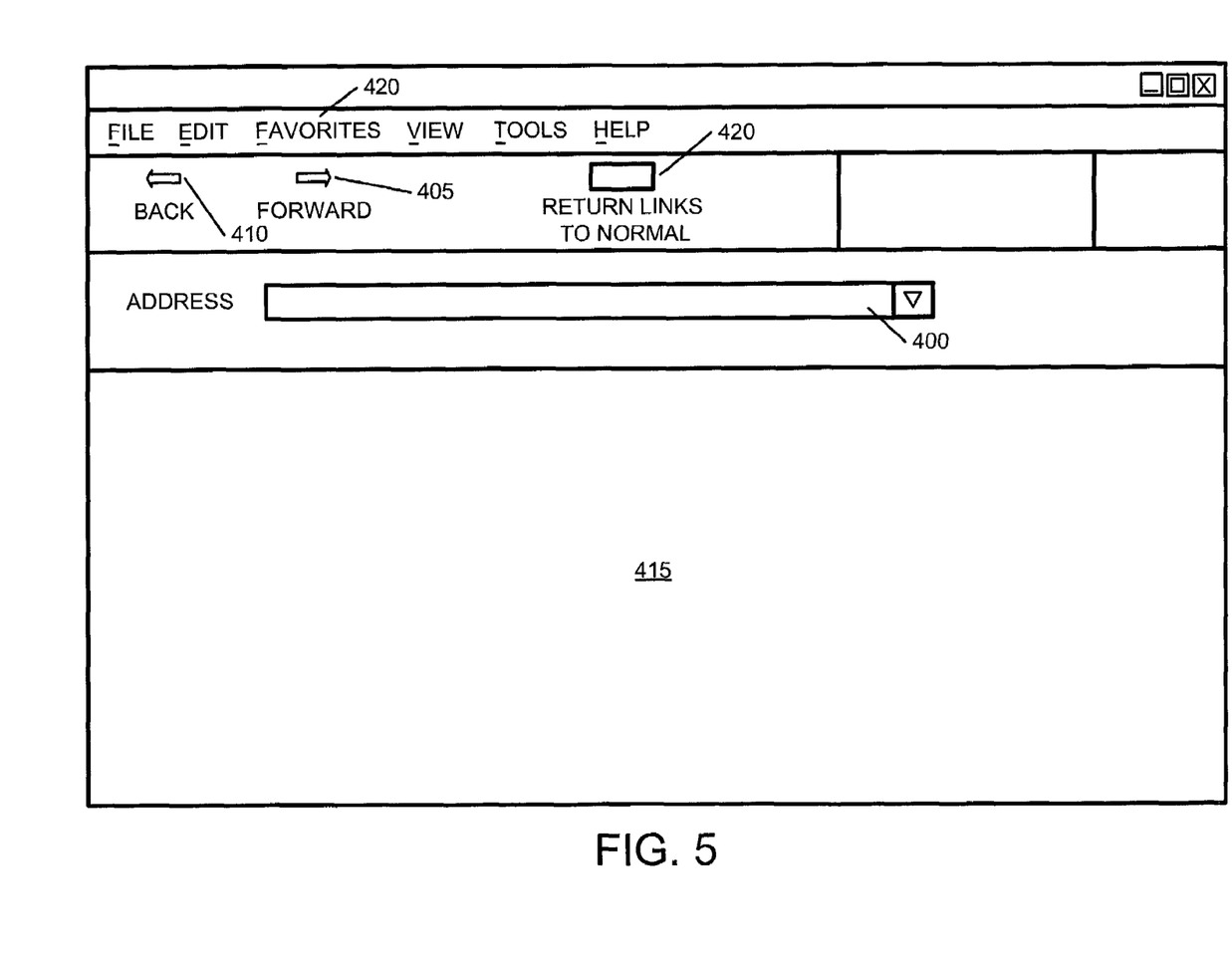
FIG. 5 depicts another representative GUI of a Web browser used by the present invention.

When the highlight links button 420 is asserted, it is changed to return links to normal button 420. Thus, if the user ever wants the links to return to their original display, the user needs only re-assert the button 420. FIG. 5 depicts button 420 after the links have been highlighted.

Figure 6:
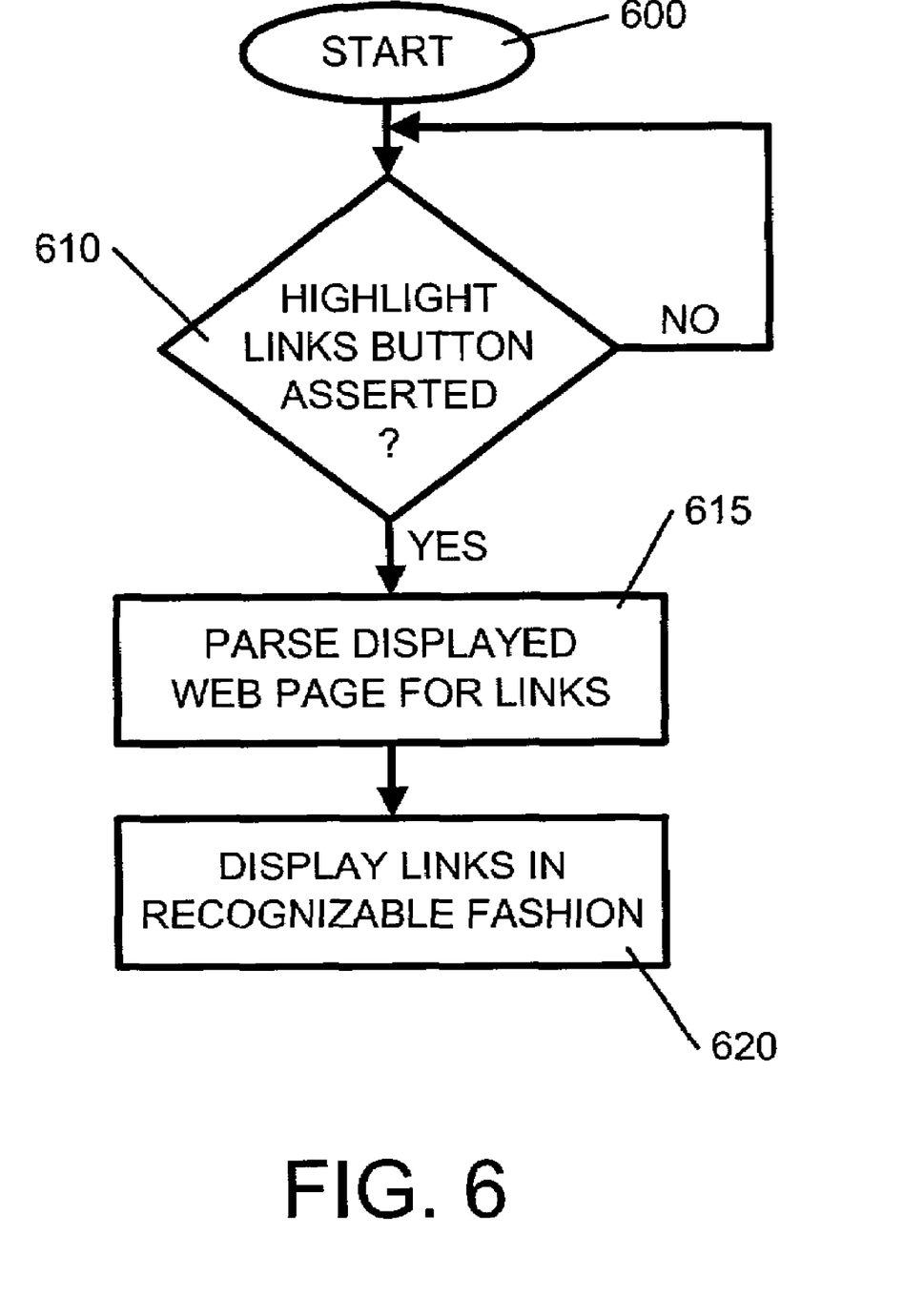
FIG. 6 is a flow diagram of a first process used by the invention.

FIG. 6 is a flow chart of a process used by the present invention. The process may be representative of a Java plug-in program or any other program. In any case, the process starts when a Web page is displayed (step 600). Then, a check is continuously being made to determine whether the highlight links button 420 is asserted. If so, the program will parse the entire Web document for embedded links (steps 510 and 515). Any links found will then be highlighted (step 620)

Figure 7:
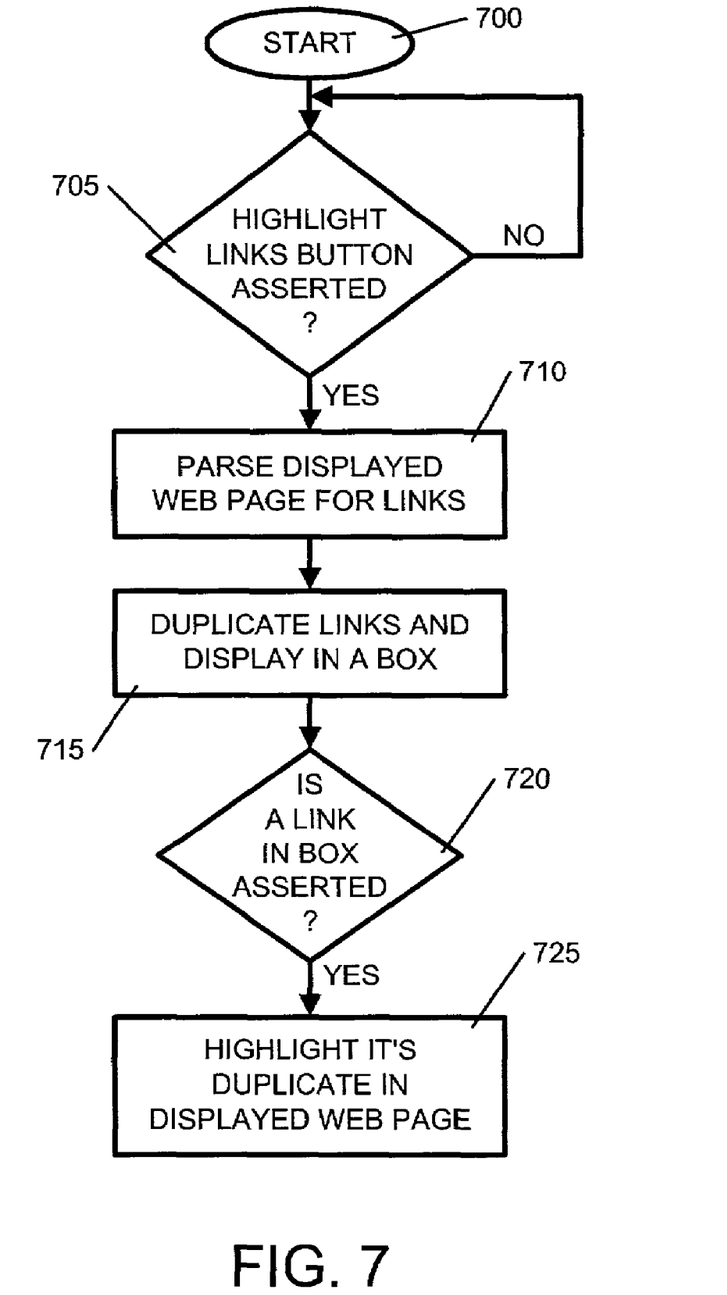
FIG. 7 is a flow diagram of a second process used by the invention.

Alternatively, when the highlight button 420 is asserted, the program will parse the displayed Web page for links. Any links found will be duplicated and displayed in a box. When the user puts the cursor on a link in the box, its duplicate link embedded in the displayed Web page will be highlighted. This process is shown in steps 700 through 725 of FIG. 7.

Although the invention is described using a highlight links button, it does not necessarily have to be implemented as such. A keystroke or a combination of keystrokes may be programmed to start the process outlined in FIGS. 6 and 7.

Thus, the description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of making links that are not easily identifiable in a displayed Web document by a user to be clearly recognizable comprising:
    displaying the Web document in a browser, the Web document having a plurality of embedded links and the browser including a highlight links button for highlighting the plurality of embedded links in the displayed Web document;
    enabling the user to assert the highlight links button to highlight the plurality of links embedded in the displayed Web document;
    parsing the displayed Web document for the plurality of embedded links in response to the user asserting the highlight links button;
    duplicating the plurality of embedded links found in the displayed Web document in response to parsing the displayed Web document;
    displaying the plurality of duplicated embedded links into a box wherein each duplicated embedded link in the box corresponds to a link in the displayed Web document; and
    highlighting a particular embedded link in the displayed Web document when a cursor is placed over a duplicated embedded link in the box, the duplicated embedded link corresponding to the particular embedded link.

2. The method of claim 1 wherein highlighting the particular link includes having the particular link flash.

3. The method of claim 1 wherein highlighting the particular link includes displaying the particular link in a different color.

4. The method of claim 1 wherein the highlighting the particular link includes displaying the particular link using a larger font.

5. The method of claim 1 wherein highlighting the particular link includes displaying the particular link using a different font.

6. The method of claim 1 wherein highlighting the particular link includes emboldening the particular link.

7. The method of claim 1 wherein highlighting the particular link includes displaying the particular link using an enlarged font and enlarging a target area in which the particular link is displayed.

8. A computer program product on a computer readable storage medium for making links that are not easily identifiable in a displayed Web document by a user to be clearly recognizable comprising:
    code means for displaying the Web document in a browser, the Web document having a plurality of embedded links and the browser including a highlight links button for highlighting the plurality of embedded links in the displayed Web document;
    code means for enabling the user to assert the highlight links button to highlight the plurality of links embedded in the displayed Web document;
    code means for parsing the displayed Web document for the plurality of embedded links in response to the user asserting the highlight links button;
    code means for duplicating the plurality of embedded links found in the displayed Web document in response to parsing the displayed Web document;
    code means for displaying the plurality of duplicated embedded links into a box wherein each duplicated embedded link in the box corresponds to a link in the displayed Web document; and
    code means for highlighting a particular embedded link in the displayed Web document when a cursor is placed over a duplicated embedded link in the box, the duplicated embedded link corresponding to the particular embedded link.

9. The computer program product of claim 8 wherein highlighting the particular link includes having the particular link flash.

10. The computer program product of claim 8 wherein highlighting the particular link includes displaying the particular link in a different color.

11. The computer program product of claim 8 wherein highlighting the particular link includes displaying the particular link using a larger font.

12. The computer program product of claim 8 wherein highlighting the particular link includes displaying the particular link using a different font.

13. The computer program product of claim 8 wherein highlighting the particular link includes emboldening the particular link.

14. The computer program product of claim 8 wherein highlighting the particular link includes displaying the particular link using
    an enlarged font and enlarging a target area in which the particular link is displayed.

15. An apparatus having at least one processor for making links that are not easily identifiable in a displayed Web document by a user to be clearly recognizable comprising:
   means for displaying the Web document in a browser, the Web document having a plurality of embedded links and the browser including a highlight links button for highlighting the plurality of embedded links in the displayed Web document;
   means for enabling the user to assert the highlight links button to highlight the plurality of links embedded in the displayed Web document;
   means for parsing the displayed Web document for the plurality of embedded links in response to the user asserting the highlight links button;
   means for duplicating the plurality of embedded links found in the displayed Web document in response to parsing the displayed Web document;
   means for displaying the plurality of duplicated embedded links into a box wherein each duplicated embedded link in the box corresponds to a link in the displayed Web document; and
   means for highlighting a particular embedded link in the displayed Web document when a cursor is placed over a duplicated embedded link in the box, the duplicated embedded link corresponding to the particular embedded link.

16. The apparatus of claim 15 wherein highlighting the particular link includes having the particular link flash.

17. The apparatus of claim 15 wherein highlighting the particular link includes displaying the particular link in a different color.

18. The apparatus of claim 15 wherein highlighting the particular link includes displaying the particular link using a larger font.

19. The apparatus of claim 15 wherein highlighting the particular link includes displaying the particular link using a different font.

20. The apparatus of claim 15 wherein highlighting the particular link includes emboldening the particular link.

21. The apparatus of claim 15 wherein highlighting the particular link includes displaying the particular link using an enlarged font and enlarging a target area in which the particular link is displayed.

22. A computer system for making links that are not easily identifiable in a displayed Web document by a user to be clearly recognizable comprising:
   at least one memory device for storing code data; and
   at least one processor for processing the code data to display the Web document in a browser, the Web document having a plurality of embedded links and the browser including a highlight links button for highlighting the plurality of embedded links in the displayed Web document, to enable the user to assert the highlight links button to highlight the plurality of links embedded in the displayed Web document, to parse the displayed Web document for the plurality of embedded links in response to the user asserting the highlight links button, to duplicate the plurality of embedded links found in the displayed Web document in response to parsing the displayed Web document, to display the plurality of duplicated embedded links into a box wherein each duplicated embedded link in the box corresponds to a link in the displayed Web document, and to highlight a particular embedded link in the displayed Web document when a cursor is placed over a duplicated embedded link in the box, the duplicated embedded link corresponding to the particular embedded link.

23. The computer system of claim 22 wherein highlighting the particular link includes having the particular link flash.

24. The computer system of claim 22 wherein highlighting the particular link includes displaying the particular link in a different color.

25. The computer system of claim 22 wherein highlighting the particular link includes displaying the particular link using a larger font.

26. The computer system of claim 22 wherein highlighting the particular link includes displaying the particular link using a different font.

27. The computer system of claim 22 wherein highlighting the particular link includes emboldening the particular link.

28. The computer system of claim 22 wherein highlighting the particular link includes displaying the particular link using an enlarged font and enlarging a target area in which the particular link is displayed.

* * * * *